(12) United States Patent
Maruchi et al.

(10) Patent No.: US 7,576,896 B2
(45) Date of Patent: Aug. 18, 2009

(54) IMAGE PROCESSING APPARATUS, IMAGE READING APPARATUS, AND DOCUMENT CONVEYANCE DEVICE

(75) Inventors: Noritoshi Maruchi, Toyokawa (JP); Hiroshi Nishikawa, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 884 days.

(21) Appl. No.: 10/981,567

(22) Filed: Nov. 5, 2004

(65) Prior Publication Data
US 2005/0219645 A1 Oct. 6, 2005

(30) Foreign Application Priority Data
Mar. 31, 2004 (JP) .............................. 2004-104364

(51) Int. Cl.
*H04N 1/04* (2006.01)
*G03G 15/00* (2006.01)

(52) U.S. Cl. ...................... 358/474; 358/498; 399/367

(58) Field of Classification Search .................. 358/496, 358/498, 474, 488, 1.12; 399/367, 371
See application file for complete search history.

(56) References Cited

U.S. PATENT DOCUMENTS
4,780,767 A 10/1988 Ohta et al.
6,254,078 B1 7/2001 Taruki
2004/0056951 A1 * 3/2004 Anderson et al. ............. 348/96

FOREIGN PATENT DOCUMENTS
JP 62-167150 A 7/1987
JP 9-80647 3/1997
JP 2000-181152 6/2000

* cited by examiner

Primary Examiner—Thomas D Lee
(74) Attorney, Agent, or Firm—Morrison and Foerster LLP

(57) ABSTRACT

An image reading apparatus capable of occurring no failure in reading of the original document sheet due to a change in the original document sheet conveyance conditions that occurs in switching a pair of rollers of document conveyance mechanism from a separated state to a contacted state by including a document reader, a document conveyance mechanism including a pair of rollers that are disposed upstream from a reading position in terms of a direction of document conveyance and a controller for, when a trailing edge of one original document sheet has passed the reading position, switching the pair of rollers of the document conveyance mechanism from a separated state to a contacted state before a leading edge of a next original document sheet reaches the reading position.

6 Claims, 9 Drawing Sheets

IMAGE PROCESSING APPARATUS, IMAGE READING APPARATUS, AND DOCUMENT CONVEYANCE DEVICE

This application is based on Japanese Patent Application No. 2004-104364 filed in Japan on Mar. 31, 2004, the entire content of which is hereby incorporated by reference.

BACKGROUND OF THE INVENTION

1. Field of the Invention

The present invention relates to an image processing apparatus having a function to read original documents (images) (such as an image reading apparatus, document reader, copying machine, scanner or multifunction peripheral), image reading apparatus and document conveyance device.

2. Description of the Related Art

As an image processing apparatus equipped with a document reading function, an image processing apparatus that incorporates a so-called sheet-through type document reader that is fixed in place and reads the original document while the original document is conveyed thereover (Japanese Laid-Open Patent Applications H9-80647 and 2000-181152) has been proposed.

The image processing apparatus disclosed in Japanese Laid-Open Patent Application H9-80647 includes document conveyance rollers on the upstream and downstream sides of the document reader in terms of the direction of document conveyance. One roller of the pair of upstream document conveyance rollers can come into contact with and move away from the other roller, and control is carried out such that while the rollers are separated from each other before the trailing edge of the original document sheet is released from between the rollers, the next original document sheet comes into contact with the rollers before arriving at the document reader. However, in this image processing apparatus, because the state of the rollers is switched from 'separated' to 'in pressure contact' based on a document sheet feed signal, the trailing edge of the original document sheet that is being conveyed over the document reader may still remain between the upstream document conveyance rollers when the document sheet feed signal is output. Therefore, the original document sheet being conveyed becomes pressed between the upstream document conveyance rollers, and the fluctuation in load on the upstream document conveyance rollers that is generated at this time leads to a fluctuation in the load on the downstream document conveyance rollers that are pressing on the same original document sheet, resulting in a change in the document conveyance speed, which leads to a failure in reading of the original document sheet.

The image processing apparatus disclosed in Japanese Laid-Open Patent Application 2000-181152 includes document conveyance rollers on the upstream and downstream sides of the document reader relative to the direction of document conveyance. One roller of the downstream document conveyance roller pair can come into contact with and move away from the other roller, and when the leading edge of the original document sheet enters the area between the downstream document conveyance rollers, the rollers are separated from each other. However, according to this image processing apparatus, the problem arises that when the state of the rollers is switched from 'separated' to 'in pressure contact', the conveyance speed of the original document sheet being conveyed therebetween changes, resulting in a failure of reading of the original document sheet.

OBJECT AND SUMMARY

An object of the present invention is to provide an image processing apparatus, image reading apparatus and document conveyance device in which a failure in reading of the original document sheet does not occur due to a change in the original document sheet conveyance conditions that occurs when the state of the two rollers comprising document conveyance rollers is switched from 'separated' to 'in pressure contact'.

In order to attain this object, according to one aspect of the present invention, an image processing apparatus equipped with a function to read original document images and an image reading apparatus each include a fixed document reader, a first original document conveyance roller pair comprising rollers that are disposed upstream from the document reader in terms of the direction of document conveyance, and can come into contact with each other or be separated from each other, a second original document conveyance roller pair comprising rollers that are disposed downstream from the document reader in terms of the direction of document conveyance and a controller that, when the trailing edge of one original document sheet has passed the reading position of the document reader, switches the state of the first original document conveyance roller pair from 'separated' to 'in contact' before the leading edge of the next original document sheet reaches the reading position.

In addition, according to the image processing apparatus and image reading apparatus of the present invention, the controller switches the state of the first original document conveyance roller pair from 'in contact' to 'separated' before the trailing edge of the original document sheet passes between the first original document conveyance roller pair.

Furthermore, according to the image processing apparatus and image reading apparatus of the present invention, the first and second original document conveyance roller pairs are linked to a driving unit that simultaneously drives the first and second original document conveyance roller pairs.

The document conveyance device according to the present invention includes a first original document conveyance roller pair comprising rollers that are disposed upstream from the document reader in terms of the direction of document conveyance, and can come into contact with each other or be separated from each other, a second original document conveyance roller pair comprising rollers that are disposed downstream from the document reader in terms of the direction of document conveyance and a controller that, when the trailing edge of one original document sheet has passed the reading position of the document reader, switches the state of the first original document conveyance roller pair from 'separated' to 'in contact' before the leading edge of the next original document sheet reaches the reading position.

According to the image processing apparatus, image reading apparatus and document conveyance device having the above construction, the state of the rollers comprising the first original document conveyance roller pair is switched from 'separated' to 'in pressure contact' when the trailing edge of one original document sheet has passed the reading position but before the leading edge of the next original document sheet reaches the reading position. In other words, the rollers do not come into pressure contact with any original document sheet when it the sheet passing the reading position. Therefore, no change in speed occurs with regard to the original document sheet that is being conveyed over the reading position. Furthermore, according to another aspect of the image processing apparatus, the state of the rollers is switched from 'in contact' to 'separated' before the trailing edge of the original document sheet passes between the rollers, and therefore the trailing edge of the original document sheet is not ejected with a sudden change in speed. Accordingly, high-quality image reading without image offset, color offset or color unevenness can be obtained.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
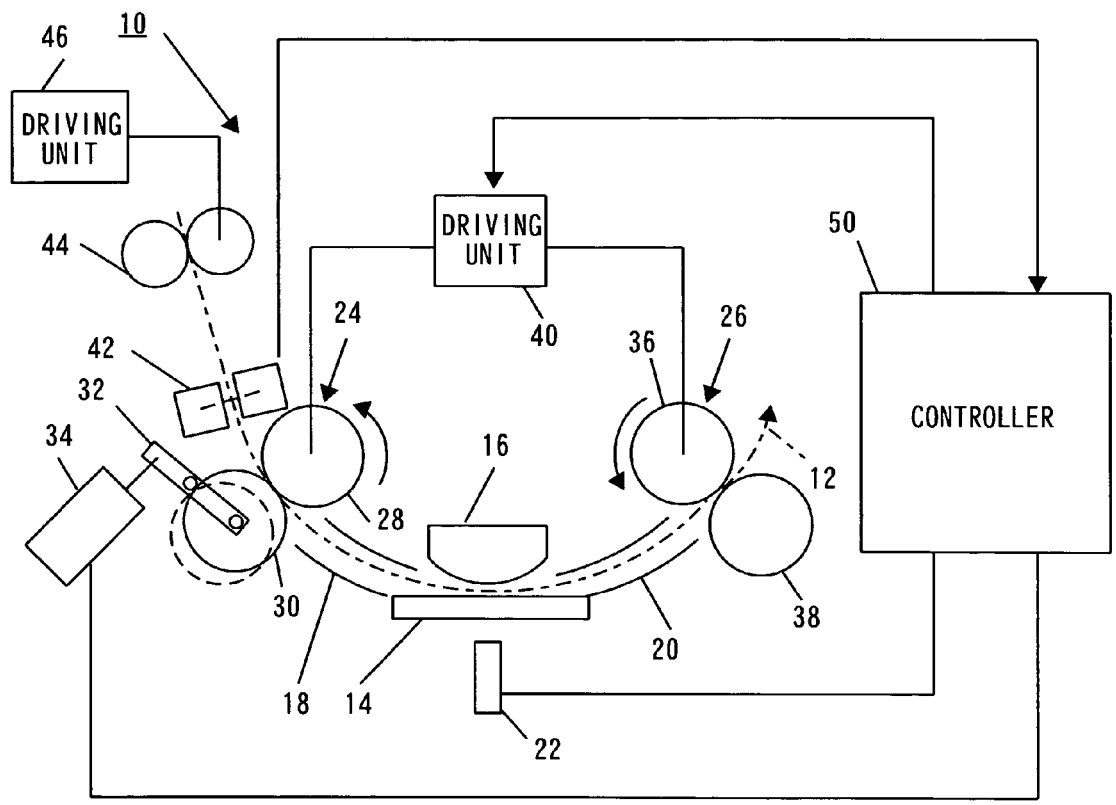
FIG. 1 is a cross-sectional view showing the basic construction of a document reader included in the image processing apparatus pertaining to the present invention.

FIG. 1 shows a document reader 10 of the image processing apparatus pertaining to the present invention, as well as a document conveyance device included in the same image processing apparatus. The image processing apparatus may comprise not only a document reader, but also any apparatus having a function to read original documents comprising information, such as letters/characters and images, printed on one side or both sides of sheets, such as an image forming apparatus incorporating a document reader and a document conveyance device (including a copying machine, a facsimile machine or an MFP, for example).

The document reader 10 has a contact glass panel 14 that comprises a transparent material such as glass and is disposed near the document conveyance path 12 shown by the dashed arrow. In the embodiment shown, the document conveyance path 12 is formed by multiple guide members (such as guide members 16, 18 and 20) including the contact glass panel 14, and other devices (such as a document feeder) are disposed around it such that original document sheets are conveyed in the direction shown by the arrow (the direction of document conveyance). A document reader 22 that reads the information (letters/characters, symbols, images, etc.) printed on the original document sheet conveyed along the upper surface of the contact glass panel 14 is disposed below the contact glass panel 14. The document reader 22 preferably constitutes a charge coupled device (CCD) comprising a number of image reading elements disposed at prescribed intervals along the direction perpendicular to the direction of document conveyance.

A first roller pair 24 and second roller pair 26 are disposed upstream and downstream from the contact glass panel 14 in terms of the direction of document conveyance. The upstream or first roller pair 24 comprise a roller 28 that is rotatably secured (i.e., a fixed roller) and a roller 30 that comes into contact with and separates from this fixed roller 28 (i.e., a movable roller). Various approaches are possible for the mechanism to move the movable roller 30 toward or away from the fixed roller 28. For example, as disclosed in Japanese Laid-Open Patent Application H9-80647, the movable roller 30 may be supported at one end of each of two arm members 32 that are movably supported, while the other ends of the arm members 32 are connected to a solenoid 34, enabling the movable roller 30 to move between the 'contact' position (the solid line position) and the 'separated' position (the dashed-line position) based on the driving of the solenoid 34. Alternatively, an eccentric cam may be linked to the rotational shaft of a motor (not shown), while tension is applied to the arm members using springs or the like such that the arm members are movably secured around the outer circumference of the eccentric cam, and the movable roller 30 is moved between the 'contact' position and the 'separated' position by moving the points of contact between the eccentric cam and the arm members based on the rotation of the motor. The downstream or second rollers 26 comprise rollers 36 and 38 that are rotatably secured while in elastic contact with each other based on tension from springs or the like. The roller 28 of the upstream roller pair 24 and the roller 36 of the downstream roller pair 26 are linked to a single driving unit (first driving unit) 40, and both rollers 28 and 36 rotate simultaneously counterclockwise in the drawing based on the driving of the driving unit 40. While the rollers 28 and 36 that are disposed above their respective paired rollers in the drawing are linked to the driving unit 40 in this embodiment, the other rollers 30 and 38 may be linked thereto instead. A document detector 42 that can detect the leading edge and the trailing edge of an original document sheet conveyed along the document conveyance path 12 is disposed further upstream from the upstream roller pair 24 in terms of the direction of document conveyance. The document detector 42 may comprise an optical detector including a light-emitting element and a light-receiving element, or a mechanical detector that physically comes into contact with the original document sheet. Paper feed roller pair 44 is disposed further upstream from the document detector 42. The paper feed roller pair 44 is linked to another driving unit (second driving unit) separate from the driving unit 40 to which the rollers 28 and 36 are linked. The first driving unit 40 and the second driving unit 46 may be linked to the same driving source (motor) or to separate driving sources (motors).

Figure 2:
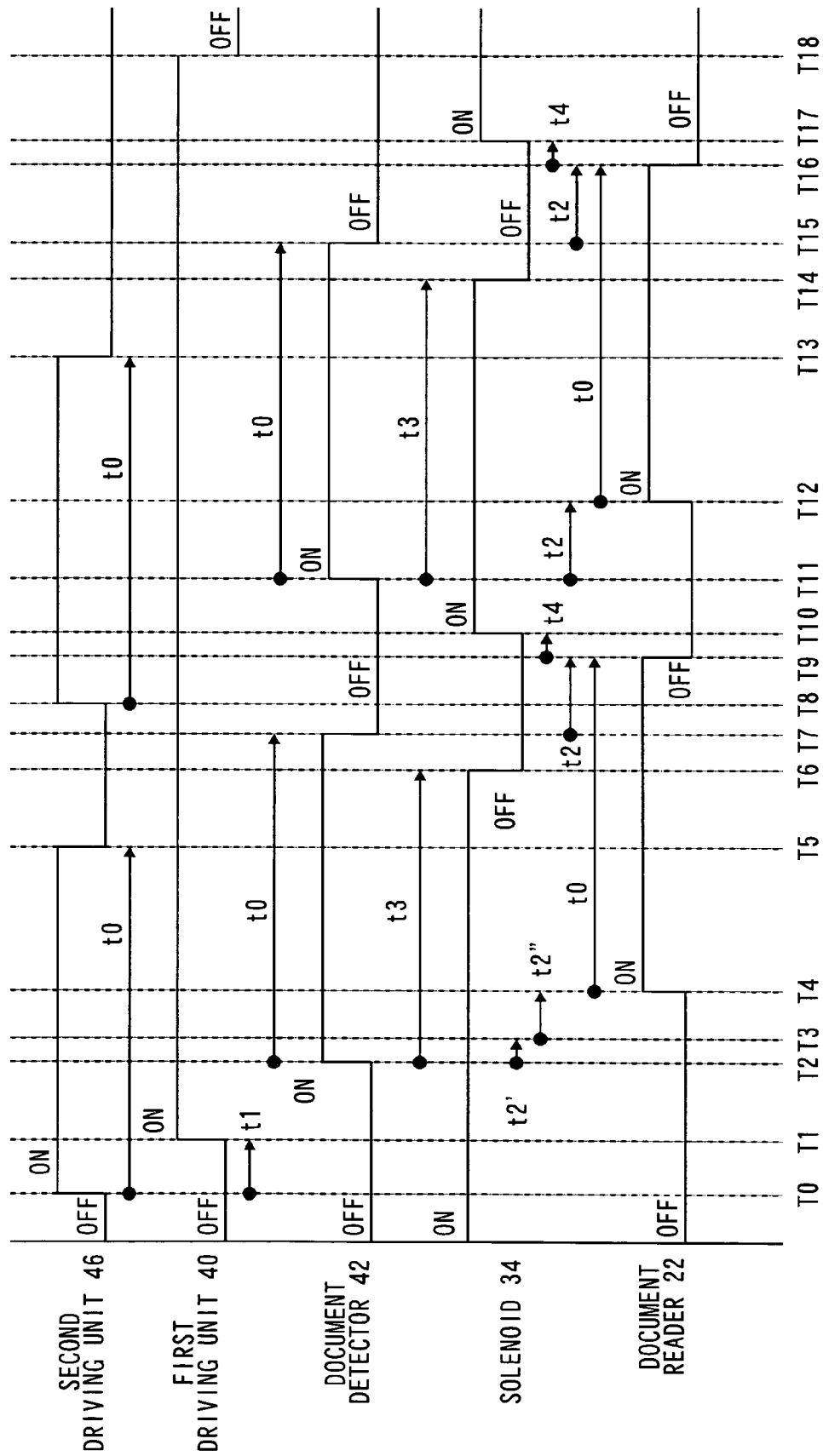
FIG. 2 shows a time chart to explain the operation of the document reader shown in FIG. 1.

The operation of the document reader 10 having this construction is controlled by a controller 50. Therefore, the controller 50 is connected to the image reader 22, the solenoid 34, the driving units 40 and 46, and the document detector 42. The specific processing performed by the controller 50 when two original document sheets S are consecutively read is specifically shown in the time chart shown in FIG. 2. The operation of the controller 50 will be described chronologically with reference to this time chart. In the following description, the first original document sheet is referred to as 'S1' and the second original document sheet is referred to as 'S2' to distinguish one from the other where appropriate.

Time T0: The controller 50 causes the rollers of the paper feed roller pair 44 to rotate by operating the second driving unit 46, such that the first original document sheet S1 is supplied along the document conveyance path 12. The solenoid 34 is set to ON at the time T0, and the rollers 28 and 30 are in pressure contact.

Time T1: Upon the expiration of an interval t1 after the driving of the second driving unit 46, the first driving unit 40 operates and the rollers 28 and 36 of the roller pairs 24 and 26 rotate. The rotations of the rollers 28 and 36 are conveyed to the rollers 30 and 38 that are in pressure contact therewith. The interval t1 is set to be longer than the amount of time taken by the leading edge S1a of the first original document sheet S1 fed by the paper feed roller pair 44 to reach the pressure contact position P2 of the rollers 28 and 30 (see FIG. 3).

Figure 3:
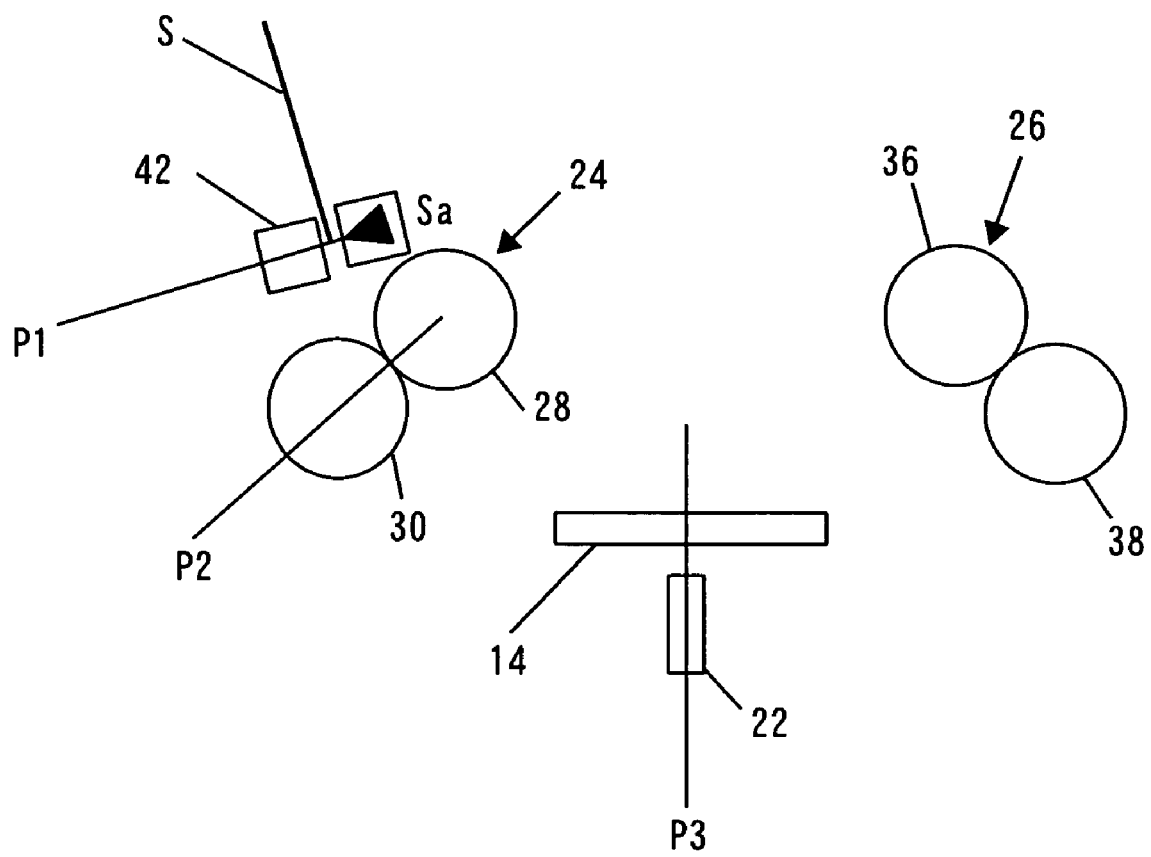
FIG. 3 is an explanatory drawing regarding the operation of the document reader shown in FIG. 1, showing the situation in which the leading edge of the original document sheet has reached the detection position.

Time T2: As shown in FIG. 3, when the leading edge S1a of the first original document sheet S1 reaches the document detection position P1 of the document detector 42, the document detector 42 detects the original document sheet leading edge S1.

Figure 4:
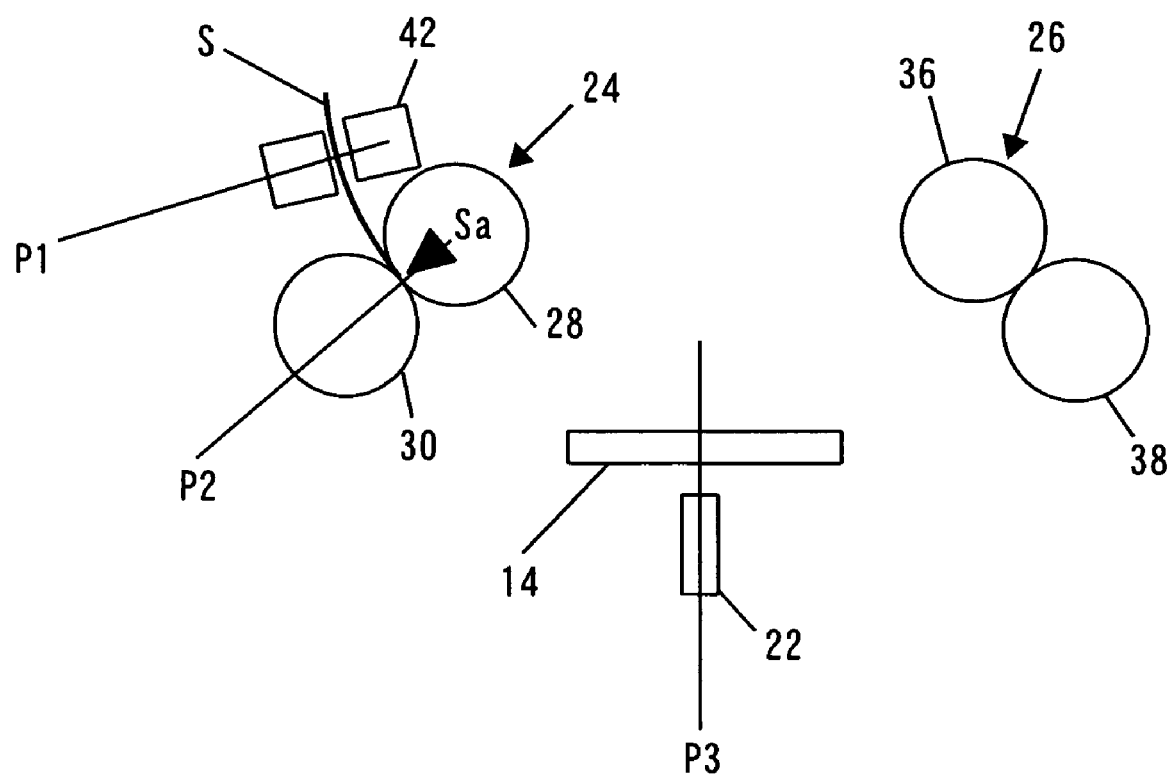
FIG. 4 is an explanatory drawing regarding the operation of the document reader shown in FIG. 1, showing the situation in which the leading edge of the original document sheet has reached the pressure contact position.

Time T3: Upon the expiration of an interval t2' after the detection of the original document sheet leading edge S1 by the document detector 42, the leading edge S1a of the first original document sheet S1 reaches the roller pressure contact position P2 of the first roller pair 24 (see FIG. 4).

Figure 5:
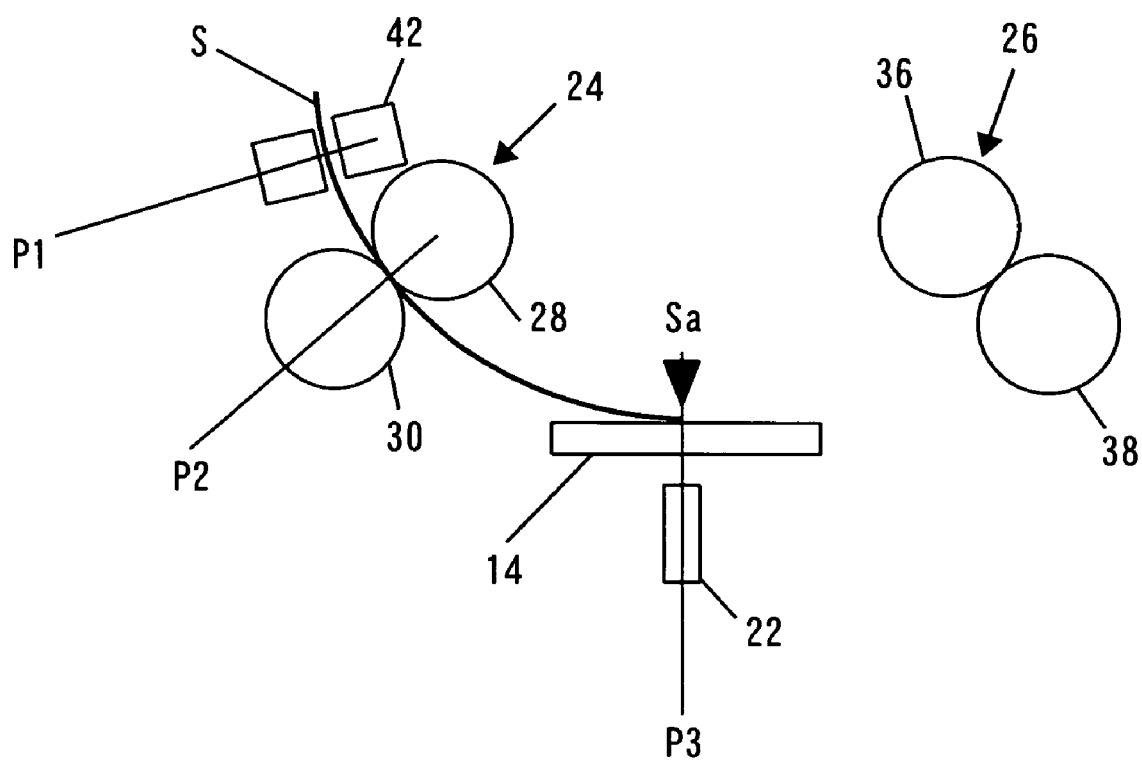
FIG. 5 is an explanatory drawing regarding the operation of the document reader shown in FIG. 1, showing the situation in which the leading edge of the original document sheet has reached the reading position.

Time T4: Subsequently, upon the expiration of an interval t2" after the leading edge S1a of the first original document sheet S1 passes the roller pressure contact position P2, the original document sheet leading edge S1 reaches a position facing the document reader 22 (the document reading position P2 (see FIG. 5)), at which time reading of the first original document sheet S1 begins.

Time T5: Upon the expiration of an interval t0 after the time T0, the controller 50 turns OFF the second driving unit 46 and stops the rotation of the paper feed roller pair 44. The interval t0 is the interval during which the original document sheet S passes any given point of the document conveyance path 12, and is obtained by dividing the length L of the original document sheet along the direction of document conveyance by the document conveyance speed (v). The document conveyance speed (v) is set in advance for the image processing apparatus. The length of the original document sheet S is calculated by multiplying the time difference between the issuance of the original document sheet leading edge detection signal and the original document sheet trailing edge detection signal output from the optical or mechanical document detector (not shown) disposed near the document conveyance path 12 by the document conveyance speed (v). The length of the original document sheet can also be calculated based on the document size signal that is output from an optical or mechanical document size detector disposed in the document feeder not shown.

Figure 6:
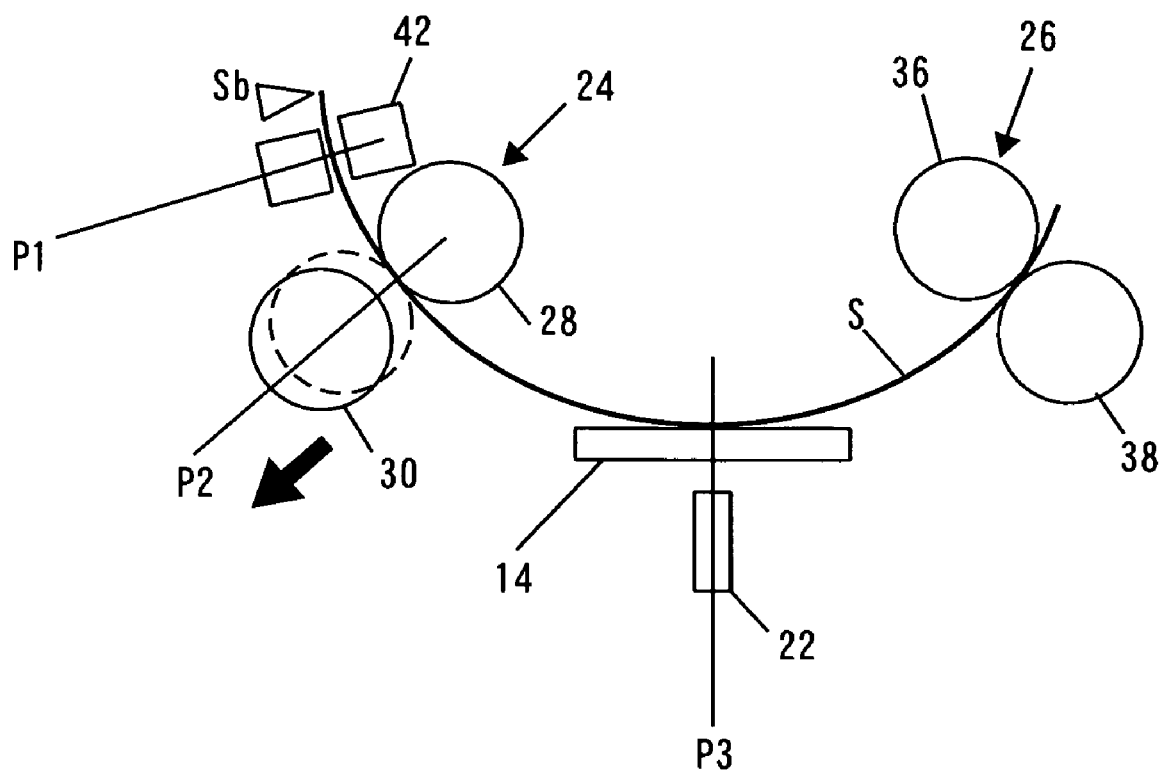
FIG. 6 is an explanatory drawing regarding the operation of the document reader shown in FIG. 1, showing the situation in which the trailing edge of the original document sheet has reached a prescribed upstream position relative to the detection position.

Time T6: Upon the expiration of a prescribed interval t3 after the detection of the original document sheet leading edge S1 by the document detector 42, the solenoid 34 turns OFF, and the movable roller 30 of the first roller pair 24 separates from the fixed roller 28, as shown in FIG. 6. The interval t3 is shorter than the interval t0 during which the original document sheet S passes any given point of the document conveyance path 12. Therefore, as shown in FIG. 6, the trailing edge S1b of the first original document sheet S1 is positioned upstream from the detection point P1 at the time T6. A part of the original document sheet S1 exists at the reading point P3 at the time T6, but because the original document sheet trailing edge S1b will not be released from between the rollers that are in pressure contact while a part of the original document sheet S1 is at the reading position P3, a sudden change in speed does not occur with regard to the original document sheet.

Figure 7:
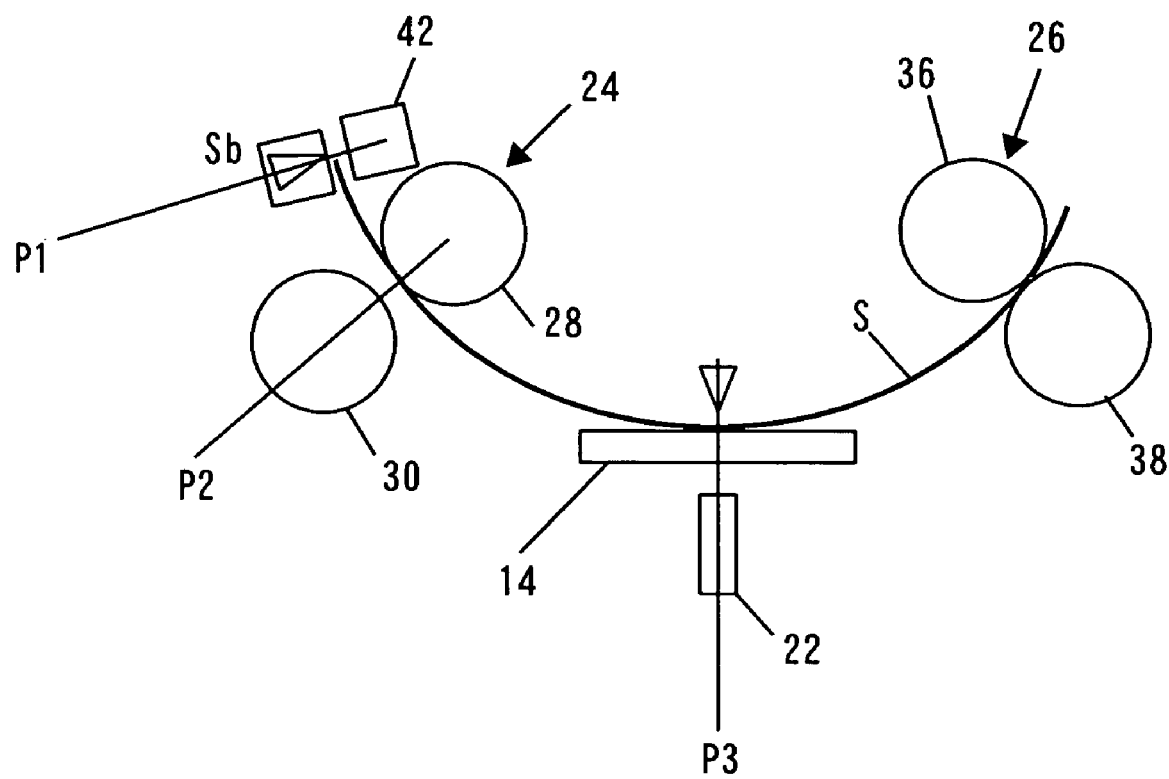
FIG. 7 is an explanatory drawing regarding the operation of the document reader shown in FIG. 1, showing the situation in which the trailing edge of the original document sheet has reached the detection position.

Time T7: As shown in FIG. 7, the document detector 42 detects the trailing edge S1b of the first original document sheet S1.

Time T8: The second driving unit 46 operates again to cause the paper feed roller pair 44 to rotate, and the second original document sheet S2 is supplied.

Figure 8:
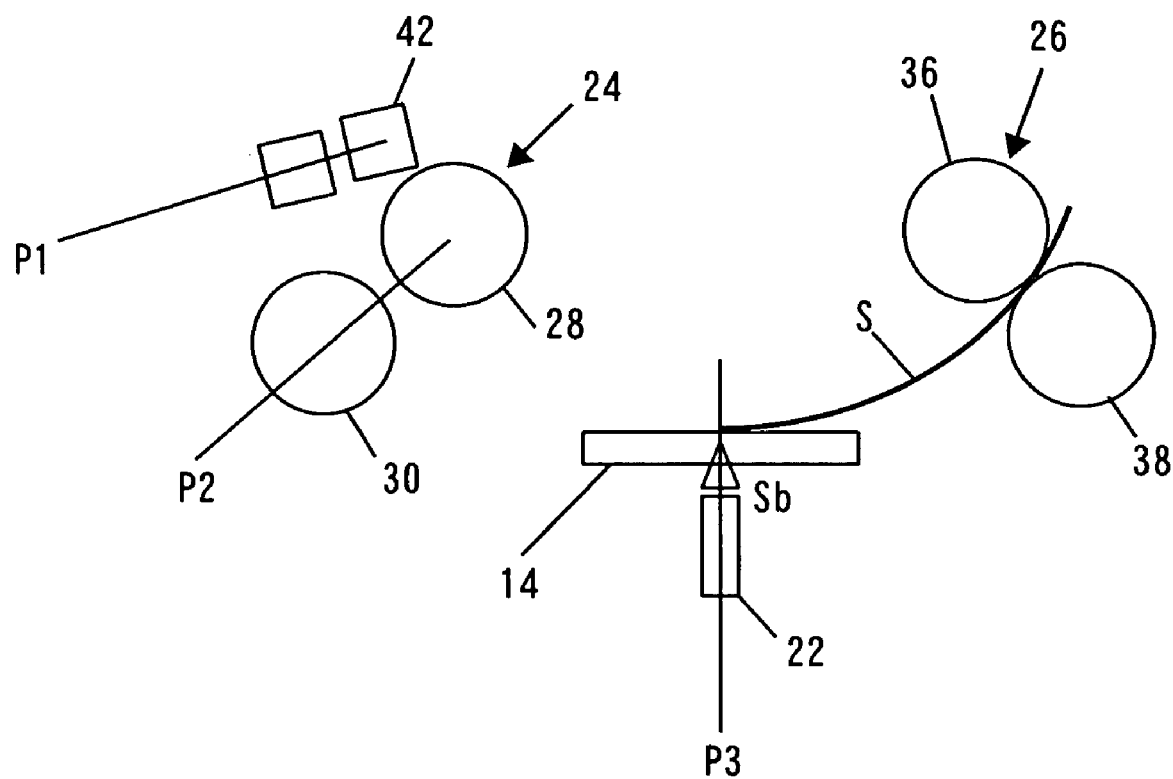
FIG. 8 is an explanatory drawing regarding the operation of the document reader shown in FIG. 1, showing the situation in which the trailing edge of the original document sheet has reached the reading position.

Time T9: Upon the expiration of an interval t2 (=t2'+t2") following the time T7, as shown in FIG. 8, the trailing edge S1b of the first original document sheet S1 reaches the reading position P3, whereby the reading of the first original document sheet by the document reader 22 ends.

Figure 9:
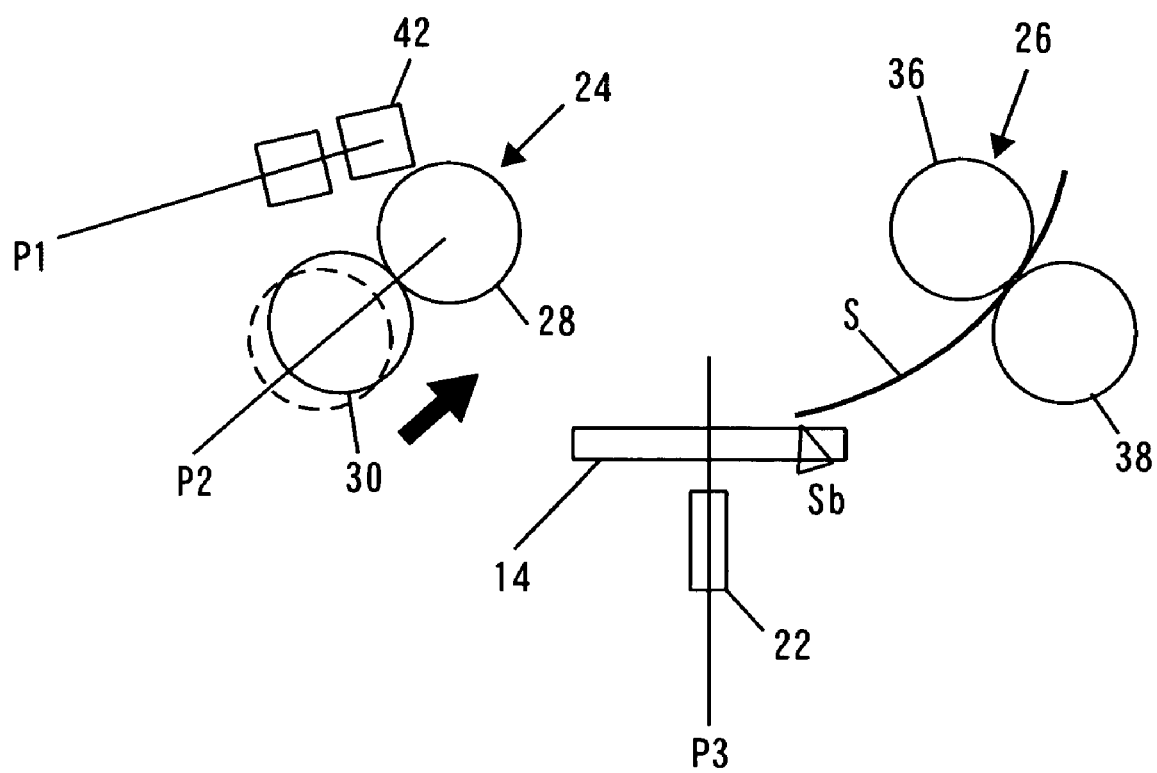
FIG. 9 is an explanatory drawing regarding the operation of the document reader shown in FIG. 1, showing the situation in which the trailing edge of the original document sheet has reached a prescribed downstream position relative to the reading position.

Time T10: As shown in FIG. 9, upon the expiration of an interval t4 after the trailing edge S1b of the first original document sheet S1 passes the reading position P3, the solenoid 34 turns ON, and the movable roller 30 of the first roller pair 24 comes into pressure contact with the fixed roller 28. At this point in time, the second original document sheet is positioned upstream from the pressure contact position P2. The time T10 can be set based on the completion of a timer set to run for a prescribed period of time (t0+t1, t0+t4, t1+t4 or t4, for example) from the point in time at which the leading or trailing edge of the original document sheet was detected by the document detector 42 or the document reader 22.

Time T11: The leading edge S2a of the second original document sheet S2 reaches the detection position P1, as shown in FIG. 3, and is detected by the document detector 42.

Time T12: Upon the expiration of the interval t2 after the leading edge S2a of the second original document sheet S2 passes the detection position P1, the original document sheet leading edge S2a reaches the reading position P3, and the second original document sheet S2 is read by the document reader 22.

Time T13: Upon the expiration of the interval t0 following the time T8, the controller 50 turns OFF the second driving unit 46 and stops the rotation of the paper feed roller pair 44.

Time T14: Upon the expiration of the interval t3 after the detection of the leading edge S2a of the second original document sheet S2 by the document detector 42, the solenoid 34 turns OFF, and the movable roller 30 of the first roller pair 24 separates from the fixed roller 28.

Time T15: The document detector 42 detects the trailing edge S2b of the original document sheet S2.

Time T16: Upon the expiration of the interval t2 (=t2'+t2") after the time T15, the trailing edge S2b of the second original document sheet S2 reaches the reading position P3, whereby the reading of the second original document sheet by the document reader 22 ends.

Time T17: Upon the expiration of the interval t4 after the trailing edge S2b of the second original document sheet S2 passes the reading position P3, the solenoid 34 turns ON, and the movable roller 30 of the first roller pair 24 comes into pressure contact with the fixed roller 28.

Time T18: The first driving unit 40 turns OFF, and the roller pairs 24 and 36 stop rotating.

As described above, using the document reader 10, the solenoid 34 is switched from OFF to ON and the movable roller 30 of the roller pair 24 comes into pressure contact with the fixed roller 28 after the trailing edge S1b of the first original document sheet S1 passes the reading position P3 but before the leading edge S2a of the next original document sheet S2 reaches the reading position P3. Therefore, the rollers 28 and 30 of the roller pair 24 do not come into pressure contact with the original document sheet S2 while it is passing the reading position P3. As a result, the conveyance speed of the original document sheet that is passing the reading position P3 is not changed due to the pressure contact from the roller pair. Therefore, problems such as distortion do not appear in the image reproduced using the read image data. Color original document sheets can also be accurately reproduced without any color offset.

Although the present invention has been fully described in connection with the preferred embodiments thereof with reference to the accompanying drawings, it is to be noted that various changes and modification are apparent to those skilled in the art. Such changes and modifications are to be understood as included within the scope of the present invention as defined by the appended claims unless they depart therefrom.

In the description provided above, the leading edge S2a of the second original document sheet S2 was disposed upstream from the detection position P1 when the trailing edge S1b of the first original document sheet S1 passed the reading position P3, but an alternate method is acceptable so long as the leading edge S2a of the second original document sheet S2 is upstream from the reading position P3 at this point in time. For example, the leading edge S2a may be disposed between the detection position P1 and the pressure contact position P2 or between the pressure contact position P2 and the reading position P3.

The times at which the solenoid 34 is switched from ON to OFF (i.e., the times T6 and T14) can be set, for example, based on the completion of the timer started upon the detection of the original document sheet leading edge by the document detector 42 (i.e., the timer used with reference to the interval t3).

The document detector 42 was disposed upstream from the first roller pair 24, but it may be disposed downstream from any of the first roller pair 24, the reading position P3 or the second roller pair 26.

The solenoid 34 was already turned OFF at the point in time at which the original document sheet trailing edge Sb was detected by the document detector 42 (i.e., the time T7), and the state of the rollers 28 and 30 was switched to 'separated', but an alternate method is acceptable so long as the switching of the rollers 28 and 30 from 'pressure contact' to 'separated' occurs before the original document sheet trailing edge Sb passes the pressure contact position P2.

What is claimed is:

1. An image reading apparatus comprising:
    a document reader configured to read an image on an original document sheet, which is being conveyed over a predetermined reading position, in a stationary state;
    a first document conveyor configured to convey the original document sheet, the first document conveyor including a pair of rollers that are disposed upstream from the reading position in terms of a direction of document conveyance and can come into contact with each other or be separated from each other;
    a second document conveyor configured to convey the original document sheet, the second document conveyor including a pair of rollers that are disposed downstream from the reading position in terms of the direction of document conveyance; and
    a controller configured to switch the pair of rollers of the first document conveyor from a separated state to a contacted state at a prescribed time after the trailing edge of the original document sheet passes the reading position but before a leading edge of a next original document sheet reaches the reading position.

2. The image reading apparatus according to claim 1, wherein said controller switches the pair of rollers of the first document conveyor from the contacted state to the separated state before the trailing edge of the one original document sheet passes between the pair of rollers of the first document conveyor.

3. The image reading apparatus according to claim 1, further comprising a driving unit for simultaneously driving each pair of rollers of the first and second document conveyors.

4. A document conveyance device comprising:
    a first document conveyor configured to convey the original document sheet, the first document conveyor including a pair of rollers that are disposed upstream from a reading position in terms of a direction of document conveyance and can come into contact with each other or be separated from each other;
    a second document conveyor configured to convey the original document sheet, the second document conveyor including a pair of rollers that are disposed downstream from the reading position in terms of the direction of document conveyance; and
    a controller configured to switch the pair of rollers of the first document conveyor from a separated state to a contacted state at a prescribed time after the trailing edge of the original document sheet passes the reading position but before a leading edge of a next original document sheet reaches the reading position.

5. The document conveyance device according to claim 4, wherein said controller switches the pair of rollers of the first document conveyor from the contacted state to the separated state before the trailing edge of the one original document sheet passes between the pair of rollers of the first document conveyor.

6. The document conveyance device according to claim 4, further comprising a driving unit for simultaneously driving each pair of rollers of the first and second document conveyors.

* * * * *